(12) United States Patent
Kidd et al.

(10) Patent No.: US 12,481,311 B2
(45) Date of Patent: Nov. 25, 2025

(54) INFORMATION HANDLING SYSTEM WITH RETRACTABLE INPUT/OUTPUT PORT COMPONENT

(71) Applicant: Dell Products L.P., Round Rock, TX (US)

(72) Inventors: Owen Kidd, Cedar Park, TX (US); Walter R. Carver, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 257 days.

(21) Appl. No.: 18/138,044

(22) Filed: Apr. 22, 2023

(65) Prior Publication Data
US 2024/0353892 A1    Oct. 24, 2024

(51) Int. Cl.
*G06F 1/16*        (2006.01)
*H05K 7/00*        (2006.01)

(52) U.S. Cl.
CPC    *G06F 1/16* (2013.01); *H05K 7/00* (2013.01)

(58) Field of Classification Search
CPC .................................. H05K 7/00; G06F 1/16
See application file for complete search history.

(56) References Cited

U.S. PATENT DOCUMENTS

| | | | | |
|---|---|---|---|---|
| 3,794,956 A | * | 2/1974 | Dubreuil | H02G 3/185 439/271 |
| 4,878,848 A | * | 11/1989 | Ingalsbe | H01R 31/06 439/76.1 |
| 4,968,260 A | * | 11/1990 | Ingalsbe | H04Q 1/028 439/922 |
| 5,773,332 A | * | 6/1998 | Glad | H05K 5/0273 439/946 |
| 6,115,242 A | * | 9/2000 | Lambrecht | G06F 1/183 361/802 |
| 6,116,927 A | * | 9/2000 | Johnson | H01R 24/62 439/946 |
| 6,419,506 B2 | * | 7/2002 | Jones | H01R 24/62 343/702 |
| 6,456,496 B1 | * | 9/2002 | Aldridge | H05K 5/0273 439/131 |
| 10,993,346 B2 | * | 4/2021 | Syu | H05K 7/1424 |
| 11,109,120 B2 | * | 8/2021 | Panella | H04Q 1/20 |
| 2008/0108249 A1 | * | 5/2008 | Carman | H01R 13/73 439/535 |
| 2009/0153002 A1 | * | 6/2009 | Kinoshita | B60R 11/0205 312/223.1 |
| 2014/0269350 A1 | * | 9/2014 | Dearing | H02G 3/0456 174/59 |
| 2022/0330419 A1 | * | 10/2022 | Karuppiah | H04L 49/40 |

* cited by examiner

*Primary Examiner* — Imani N Hayman
*Assistant Examiner* — Rashen E Morrison
(74) *Attorney, Agent, or Firm* — Terrile, Cannatti & Chambers, LLP; Stephen A. Terrile

(57) ABSTRACT

A retractable input/output port component for a server type information handling system. The retractable input/output component includes a housing, the housing having a front facet and a side facet, the housing being configured to be retracted into a volume of the server type information handling system; an ever present feature port, the ever present feature port being mounted to the front facet of the housing; and, a temporary use feature, the temporary use feature being mounted to the side facet of the housing, the temporary use feature being accessible when the housing is in an extracted configuration.

12 Claims, 10 Drawing Sheets

INFORMATION HANDLING SYSTEM WITH RETRACTABLE INPUT/OUTPUT PORT COMPONENT

BACKGROUND OF THE INVENTION

Field of the Invention

The present invention relates to information handling systems. More specifically, embodiments of the invention relate to server type information handling systems within information technology (IT) environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers.

SUMMARY OF THE INVENTION

A system and method for hiding temporary use features on an information handling system while enabling access to the temporary use features when they are needed.

In one embodiment, the invention relates to a retractable input/output port component for a server type information handling system comprising: a housing, the housing having a front facet and a side facet, the housing being configured to be retracted into a volume of the server type information handling system; an ever present feature port, the ever present feature port being mounted to the front facet of the housing; and, a temporary use feature, the temporary use feature being mounted to the side facet of the housing, the temporary use feature being accessible when the housing is in an extracted configuration.

In another embodiment, the invention relates to a system comprising: a processor; a data bus coupled to the processor; and, a retractable input/output port component, the retractable input/output port component comprising: a housing, the housing having a front facet and a side facet, the housing being configured to be retracted into a volume of the server type information handling system; an ever present feature port, the ever present feature port being mounted to the front facet of the housing; and, a temporary use feature, the temporary use feature being mounted to the side facet of the housing, the temporary use feature being accessible when the housing is in an extracted configuration.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
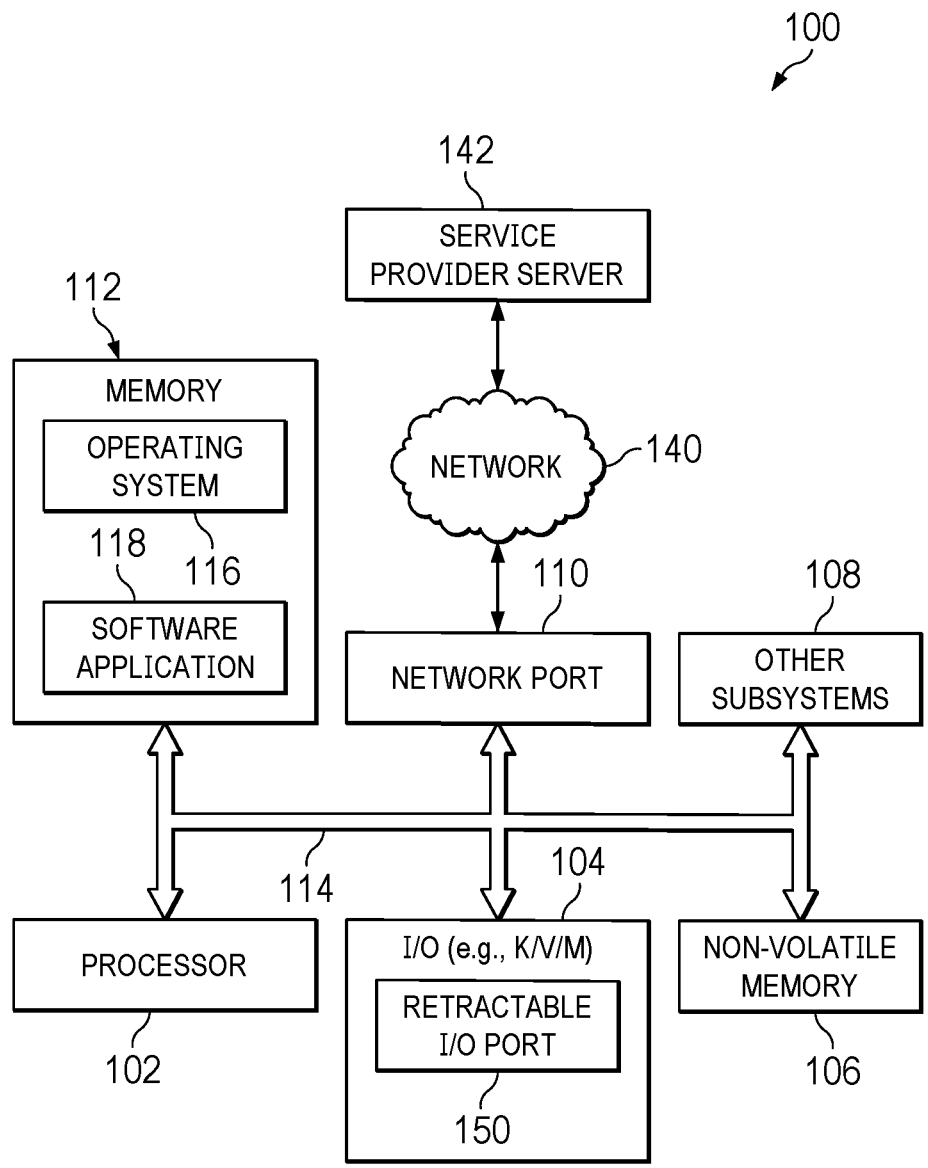
FIG. 1 shows a general illustration of components of an information handling system as implemented in the system and method of the present invention.

Various aspects of the disclosure include an appreciation that many features of an information handling system contend for faceplate space (e.g., storage features, I/O features, user interface features, airflow features and power supply features). Various aspects of the disclosure include an appreciation that often the available faceplate space is not sufficient for the coexistence of all desired feature use cases. Various aspects of the disclosure include an appreciation that this issue is especially present with information handling systems which are designed with smaller form factors such as rack server type information handling systems.

After tradeoffs have been made and some potentially desired features have been dropped, remaining features are often be combined (e.g., a shared network interface card (NIC)) or moved outside of the rack server envelope (e.g., into the server ears) to coexist in the same system while avoiding physical conflicts with other facets of the rack. Various aspects of the disclosure include an appreciation that some potential server features may be of temporary use such as when the features are only intended for access while a user is physically present at the system (e.g., while operating a mobile repair station). Various aspects of the disclosure include an appreciation that these temporary use features may be hidden when not in use. Various aspects of the disclosure include an appreciation that hiding the temporary use features can optimize faceplate space by using server depth to hide the temporary use features.

A system and method are disclosed for hiding temporary use features on an information handling system while enabling access to the temporary use features when they are needed. In certain embodiments, the system and method include a retractable input/output port component. In certain embodiments, the retractable input/output port component is configured as a cubic structure with an array of ports on the front facet and one or more ports on the side facets. Ever-present features are populated on the front facing facet (such as data port and serial port features) and other temporary use features (such as VGA and USB port features) are installed on the side facets. The cubic structure is normally seated inside the volume of the server, with the front facet flush with the server faceplate. When a user desires access to temporary use features, the input/output port extender is pulled forward away from the volume of the server to expose the temporary use features on the side facets of the cubic structure. The extraction of the cubic structure may be performed manually through user applied pull-force, or through methods of automatic ejection following some actuation by the user. In certain embodiments, the cubic structure is supported by rails on one or more of the facets. In certain embodiments, the cubic structure includes one or more stops to provide a limited extraction distance. In certain embodiments, the limited extraction distance allows the remainder of the cubic structure contained within the volume of the server body to prevent pivoting of the entire cubic structure.

Such a retractable input/output port component allows for maximizing faceplate space while keeping all features in their native forms. Such a retractable input/output port component designates certain ports as temporary use. Such a retractable input/output port component implements a depth based scheme for hiding these ports in the normal use case. This system and method is especially applicable to cloud servers where cold aisle configurations are desired and as such the faceplate space often accommodates not only storage but also I/O slots. Such a retractable input/output port component may be used in any server device or information handling system which has temporary use ports that may be hidden when the system is operating in its typical operating mode of operation. Such a retractable input/output port component improves availability of features and airflow in server devices where faceplate space is limited.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116. In certain embodiments, the information handling system 100 is one of a plurality of information handling systems within a data center. In certain embodiments, the information handling system 100 comprises a server type information handling system. In certain embodiments, the server type information handling system is configured to be mounted within a server rack. In certain embodiments, the other subsystem 108 includes one or more power supplies for supplying power to the other components of the information handling system 100. In certain embodiments, the I/O devices include a retractable I/O port component 150.

In certain embodiments, the information handling system 100 comprises a server type information handling system. In certain embodiments, the server type information handling system comprises a server type information handling system. As used herein, a server type information handling system broadly refers to an information handling system which is physically configured to be mounted within a server rack.

In certain embodiments, the retractable I/O port component 150 hides temporary use features on an information handling system while enabling access to the temporary use features when they are needed. In certain embodiments, the retractable input/output port component 150 is configured as a cubic structure with an array of ports on the front facet and one or more ports on the side facets. Ever present features are populated on the front facing facet (such as data port and serial port features) and other temporary use features (such as VGA and USB port features) are installed on the side facets. The cubic structure is normally seated inside the volume of the server, with the front facet flush with the server faceplate. When a user desires access to temporary use features, the input/output port extender 150 is pulled forward away from the volume of the server to expose the temporary use features on the side facets of the cubic structure. The extraction of the cubic structure may be performed manually through user applied pull-force, or through methods of automatic ejection following some actuation by the user. In certain embodiments, the cubic structure is supported by rails on one or more of the facets. In certain embodiments, the cubic structure includes one or more stops to provide a limited extraction distance. In certain embodiments, the limited extraction distance allows the remainder of the cubic structure contained within the volume of the server body to prevent pivoting of the entire cubic structure.

Such a retractable input/output port component 150 allows for maximizing faceplate space while keeping all features in their native forms. Such a retractable input/output port component designates certain ports as temporary use. Such a retractable input/output port component 150 implements a depth based scheme for hiding these ports in the normal use case. This retractable input/output port component 150 is especially applicable to servers where cold aisle configurations are desired and as such the faceplate space often accommodates not only storage but also I/O slots. Such a retractable input/output port component 150 may be used in any server device or information handling system which has temporary use ports that may be hidden when the system is operating in its typical operating mode of operation. Such a retractable input/output port component 150 improves availability of features and airflow in server devices where faceplate space is limited.

Figure 2:
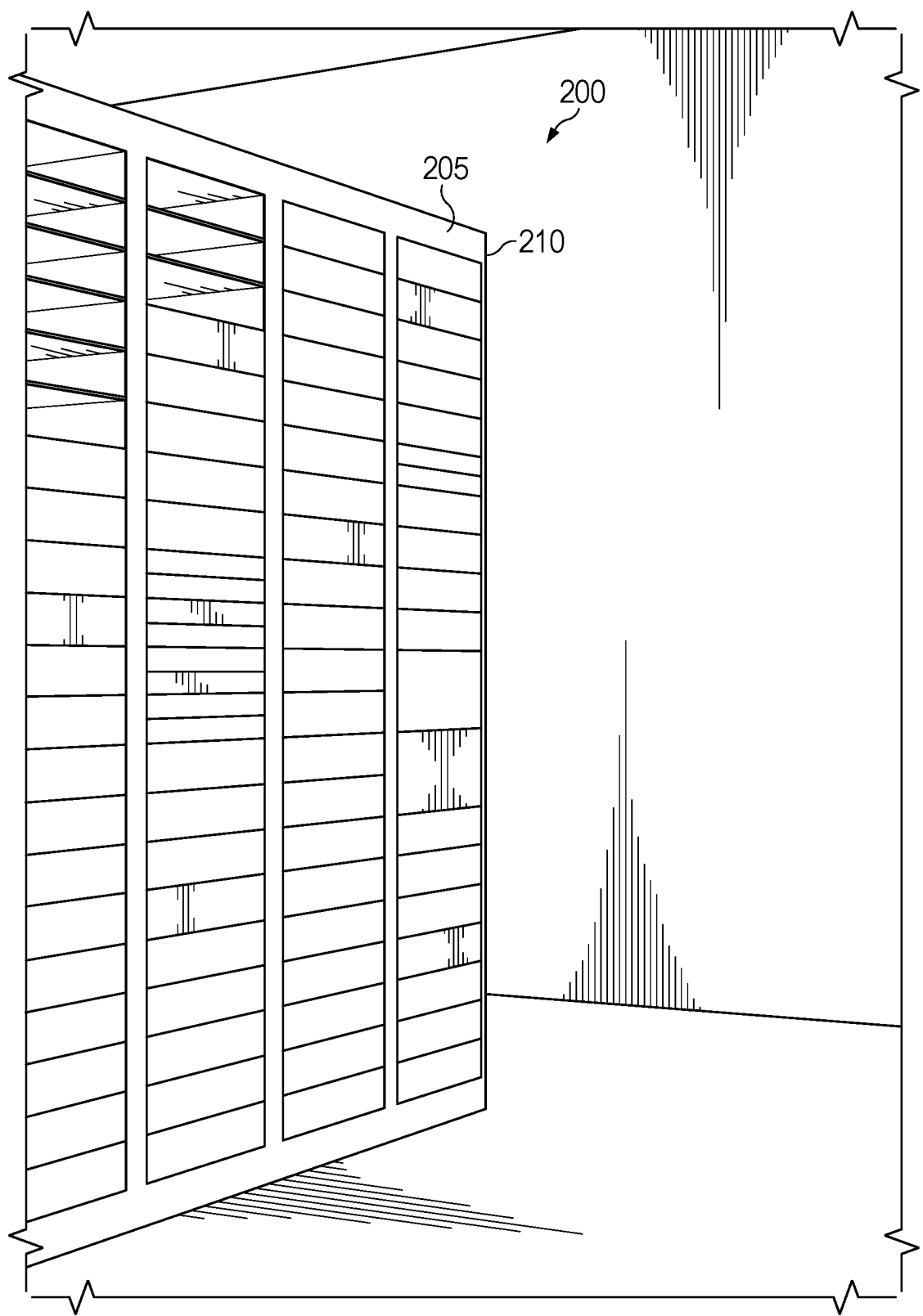
FIG. 2 shows a perspective view of a portion of a data center within an IT environment.

FIG. 2 shows a perspective view of a portion of an IT environment 200. The IT environment includes one or more racks 205 which include a plurality of information handling systems 100, often referred to as a server rack. In various embodiments, the IT environment 200 comprises a data center. As used herein, a data center refers to an IT environment which includes a plurality of networked information handling systems 100. In various embodiments, the information handling systems 100 of the data center include some or all of router type information handling systems, switch type information handling systems, firewall type information handling systems, storage system type information handling systems, server type information handling systems and application delivery controller type information handling systems. In certain environments, the information handling systems 100 are mounted within respective racks. As used herein, a rack refers to a physical structure that is designed to house the information handling systems 100 as well as the associated cabling and power provision for the information handling systems. In certain embodiments, a rack includes side panels to which the information handling systems are mounted. In certain embodiments, the rack includes a top panel and a bottom panel to which the side panels are attached. In certain embodiments, the side panels each include a front side panel and a rear side panel.

In certain embodiments, a plurality of racks is arranged continuous with each other to provide a rack system. An IT environment can include a plurality of rack systems arranged in rows with aisles via which IT service personnel can access information handling systems mounted in the racks. In certain embodiments, the aisles can include front aisles via which the front of the information handling systems may be accessed and hot aisles via which the infrastructure (e.g., data and power cabling) of the IT environment can be accessed.

Each respective rack includes a plurality of vertically arranged information handling systems 210. In certain embodiments, the information handling systems may conform to one of a plurality of standard server sizes. In certain embodiments, the plurality of server sizes conforms to particular rack unit sizes (i.e., rack units). As used herein, a rack unit broadly refers to a standardized server system height. As is known in the art, a server system height often conforms to one of a 1 U rack unit, a 2 U rack unit and a 4 U rack unit. In general, a 1 U rack unit is substantially (i.e., +/−20%) 1.75" high, a 2 U rack unit is substantially (i.e., +/−20%) 3.5" high and a 4 U rack height is substantially (i.e., +/−20%) 7.0" high.

Figure 3:
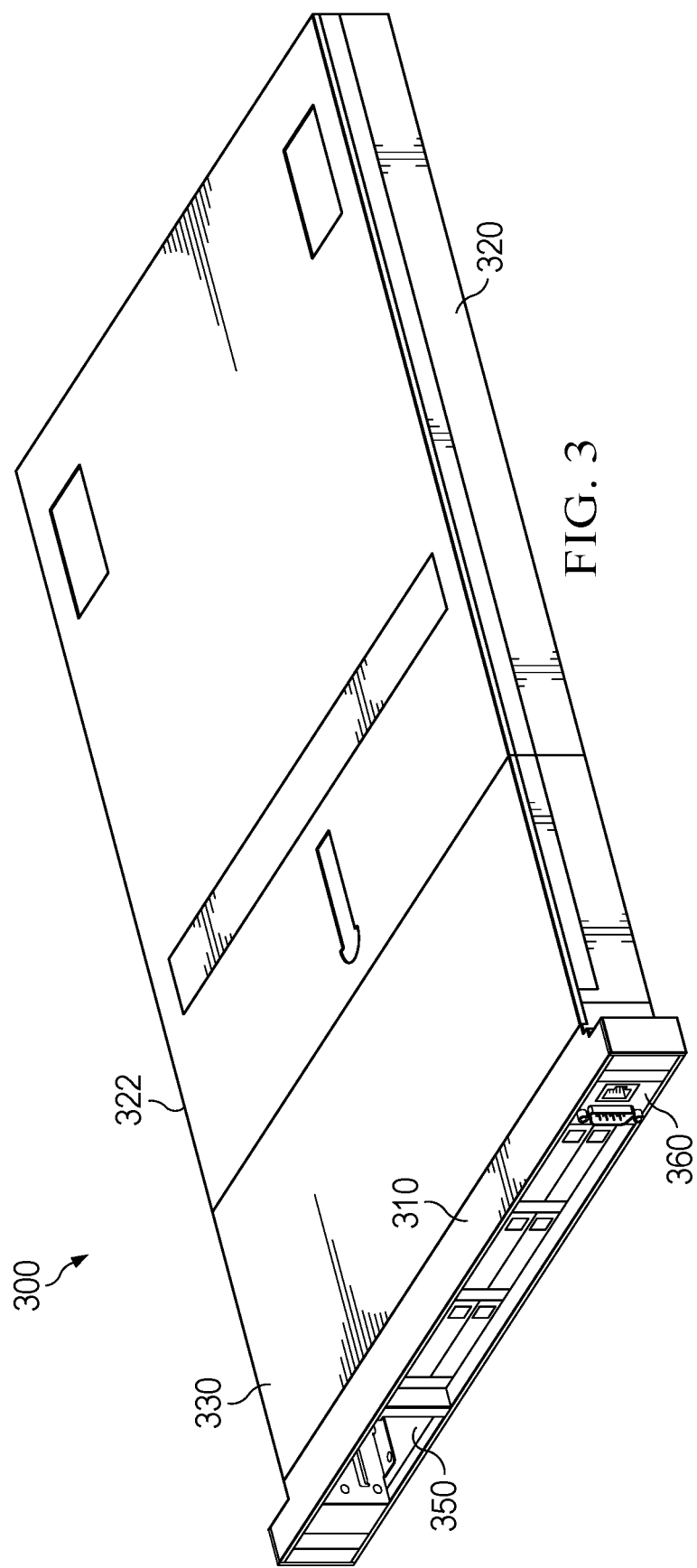
FIG. 3 shows a generalized perspective view of an example server type information handling system.

FIG. 3 shows a generalized perspective view of an example server type information handling system 300. In certain embodiments, the server type information handling system includes a front portion 310, which is accessible when the server type information handing system 300 is mounted on a server rack. In certain embodiments, the side portions 320, 322 mount to the rack via respective server mounting components. In certain embodiments, the side portions mount to the rack via respective mechanical guiding features which are mechanically coupled to respective server mounting components. In certain embodiments, the server type information handling system can slide out from the rack via the respective mechanical guiding features. In certain embodiments, internal components of the blade type information handling system 300 may be accessed by removing a top panel 330 of the blade type information handing system 300. In certain embodiments, the blade type information handing system 300 includes a bay 350 via which components may be mounted to the blade type information handling system.

In certain embodiments, the information handling system 300 includes a retractable I/O port component 360. In certain embodiments, the retractable I/O port component 360 hides temporary use features on an information handling system while enabling access to the temporary use features when they are needed. Such a retractable input/output port component 360 allows for maximizing faceplate space while keeping all features in their native forms. Such a retractable input/output port component designates certain ports as temporary use. Such a retractable input/output port component 360 implements a depth based scheme for hiding these ports in the normal use case. This retractable input/output port component 360 is especially applicable to cloud servers where cold aisle configurations are desired and as such the faceplate space often accommodates not only storage but also I/O slots. Such a retractable input/output port component 360 may be used in any server device or information handling system which has temporary use ports that may be hidden when the system is operating in its typical operating mode of operation. Such a retractable input/output port component 360 improves availability of features and airflow in server devices where faceplate space is limited.

Figure 4:
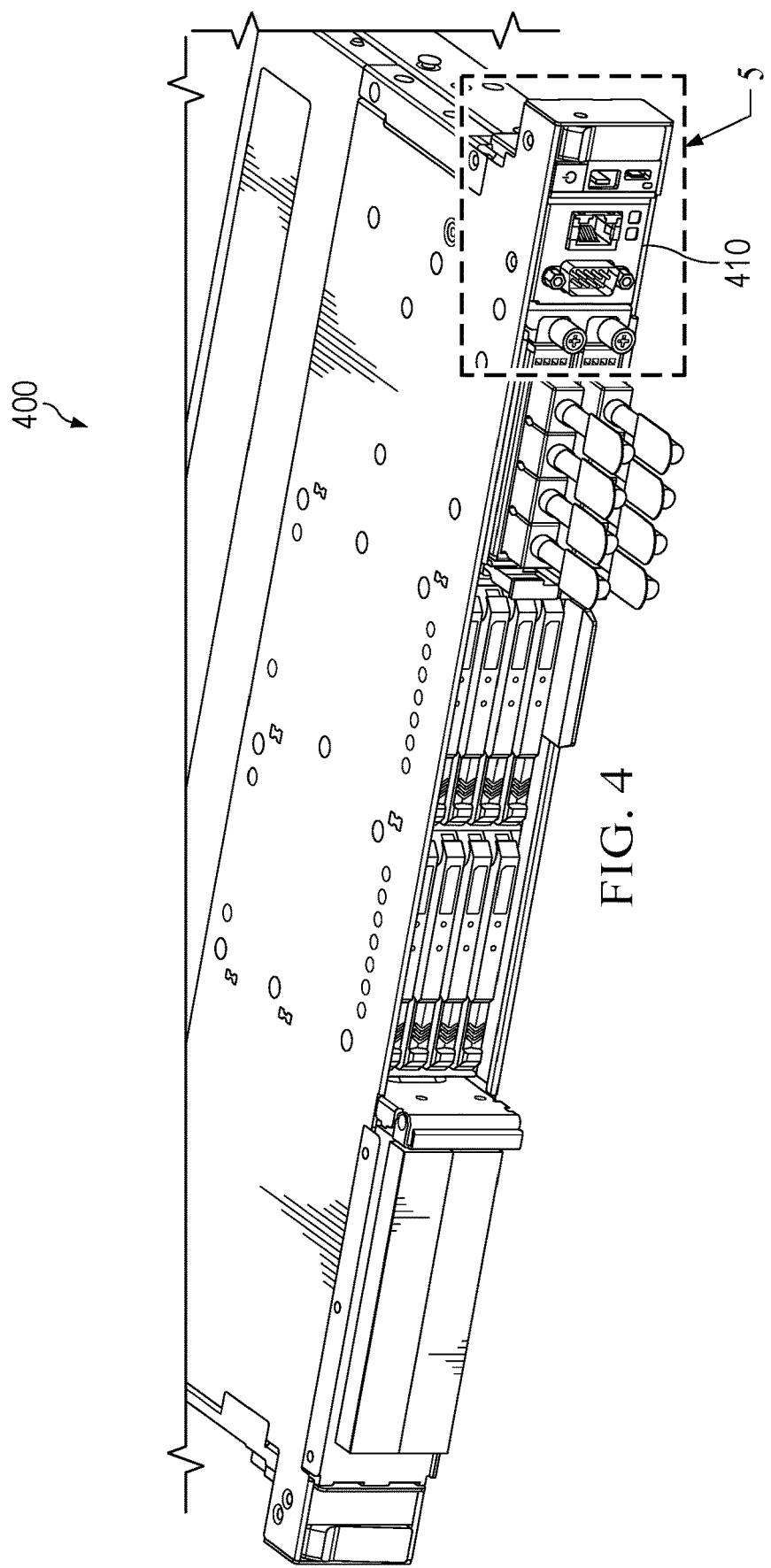
FIG. 4 shows a perspective view of a front portion of an example server type information handling system configured with a retractable input/output port component in a retracted configuration.
Figure 5:
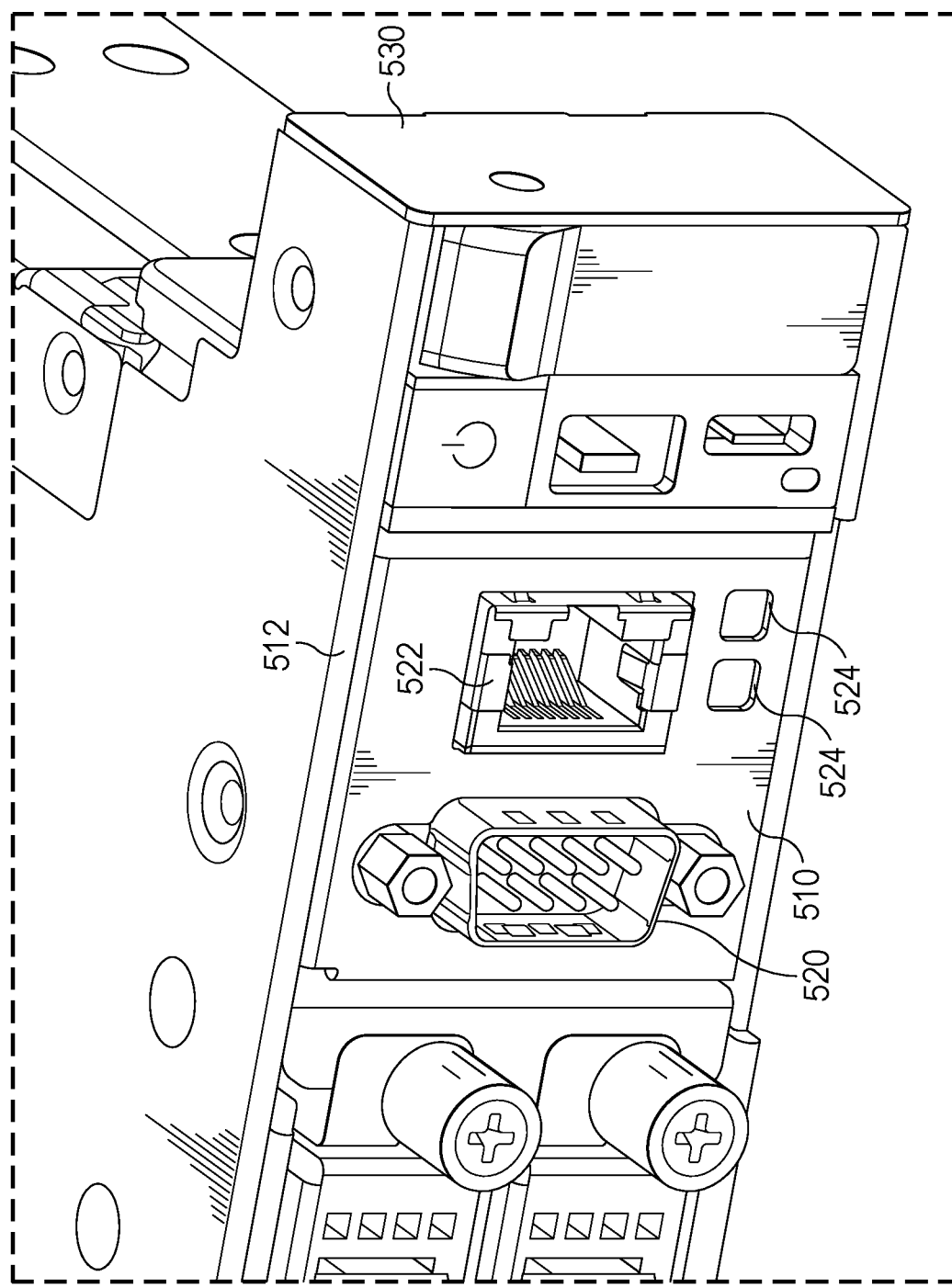
FIG. 5 shows a perspective view of a retractable input/output port component.
Figure 6:
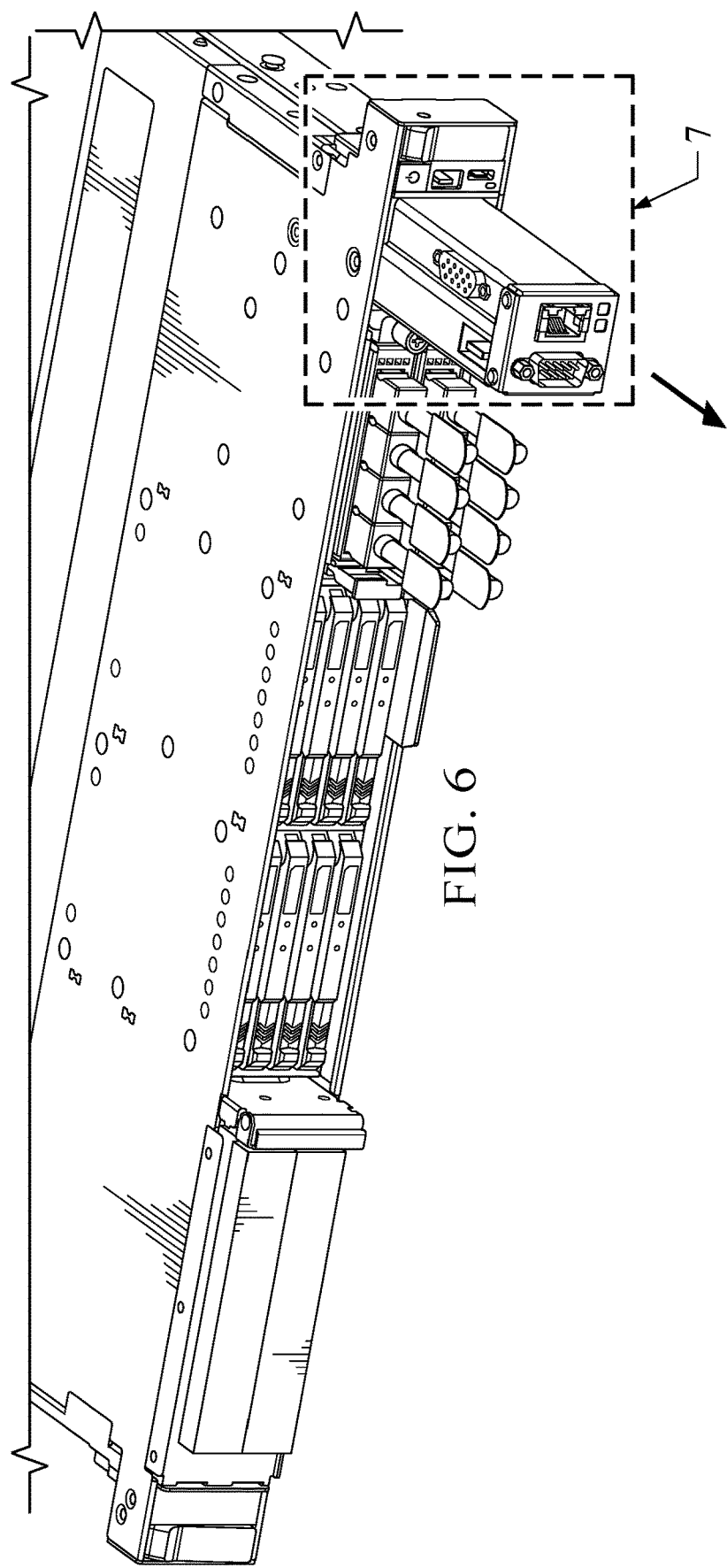
FIG. 6 shows a perspective view of a front portion of an example server type information handling system configured with a retractable input/output port component in a extracted configuration.
Figure 7:
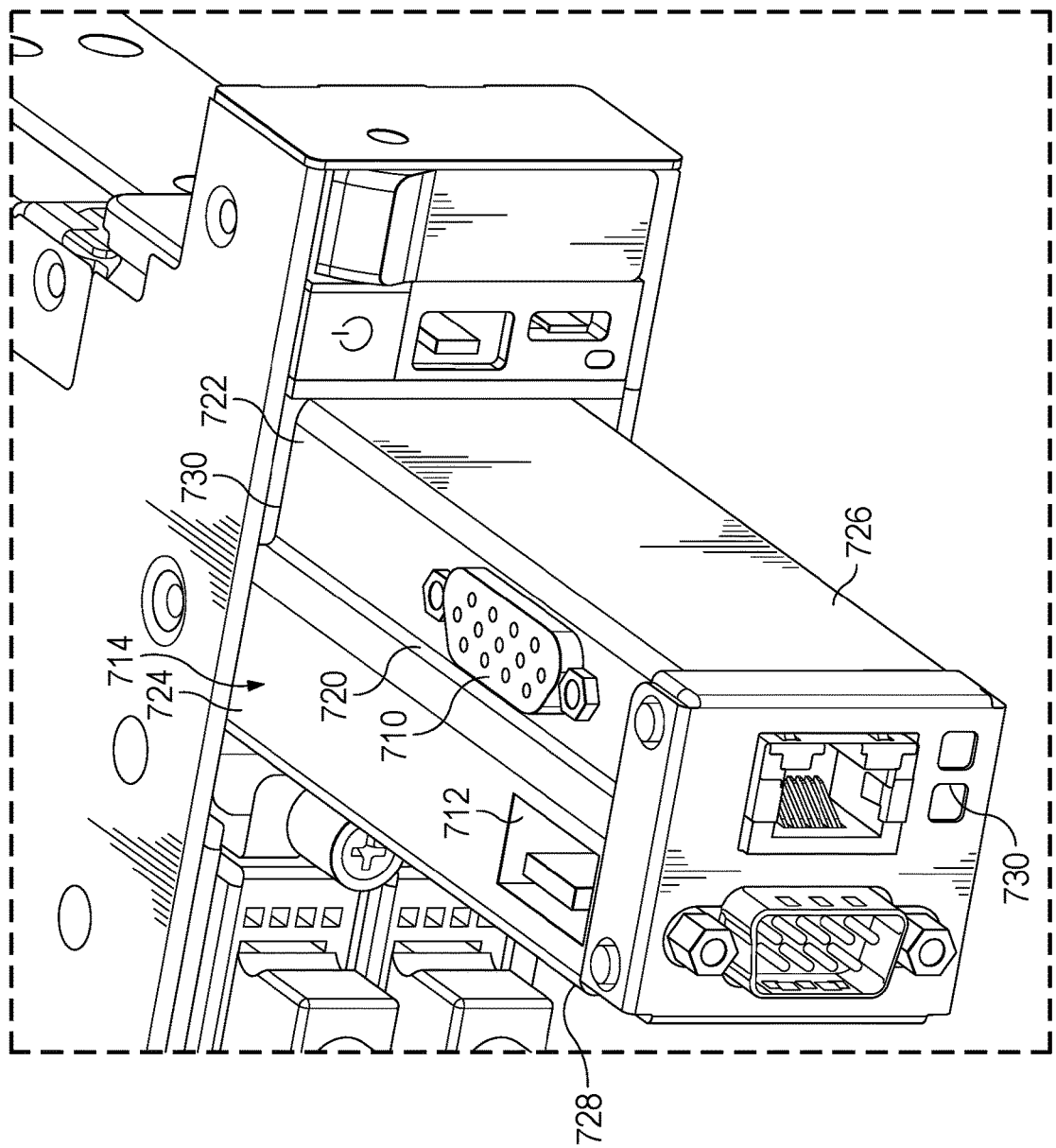
FIG. 7 shows a perspective view of a retractable input/output port component in an extracted configuration.

FIG. 4 shows a perspective view of a front portion 400 of an example server type information handling system configured with a retractable input/output port component 410 in a retracted configuration. FIG. 5 shows a perspective view of a retractable input/output port component. FIG. 6 shows a perspective view of a front portion of an example server type information handling system configured with a retractable input/output port component in a extracted configuration. FIG. 7 shows a perspective view of a retractable input/output port component in an extracted configuration. FIG. 8 shows a front view of an example information handling system.

In certain embodiments, the retractable I/O port component 410 hides temporary use features on an information handling system while enabling access to the temporary use features when they are needed. In certain embodiments, the retractable input/output port component 410 is configured to include a housing such as a cubic structure with an array of ports on the front facet and one or more ports on the side facets. Ever present features are populated on the front facing facet. In certain embodiments, the ever present features on the front facet 510 include a serial port 524 and a data port 522 (e.g., a RJ45 port). As used herein, ever present features broadly refer to features of an information handling system to which access is desirable when the information handling system is executing in its normal mode of operation. As used herein, temporary use features broadly refer to features of an information handing system to which access is desirable when the information handling system is executing in something other than its normal mode of operation, for example, when the information handling system is executing in a remediation mode of operation. In certain embodiments, the temporary use features include a VGA port 710 and a USB port 712 installed on a side facet 714. The cubic structure is normally seated inside the volume of the server, with the front facet 510 flush with the server faceplate 512. In certain embodiments, the front facet 510 includes one or more visual indicators 520.

When a user desires access to temporary use features, the retractable input/output port component 410 is pulled forward away from the volume of the server to expose the temporary use features on the side facets of the cubic structure (see e.g., FIGS. 6 and 7). The extraction of the cubic structure may be performed manually through user applied pull-force, or through methods of automatic ejection following some actuation by the user. In certain embodiments, the cubic structure is supported by rails on one or more of the facets. In certain embodiments, the cubic structure includes one or more stops to provide a limited extraction distance. In certain embodiments, the limited extraction distance allows the remainder of the cubic structure contained within the volume of the server body to prevent pivoting of the entire cubic structure.

In certain embodiments, the cube of the retractable input/output port component 410 includes a ridge 720 which separates a first portion 722 and a second portion 724 of the side facet 714. In certain embodiments, the first portion 722 and the second portion 724 provide the cube with different heights along a first side facet 726 and a second side facet 728. In certain embodiments, the ridge 720 slides along a projection 730 of the faceplate of the information handling system. In certain embodiments, the interaction of the ridge 720 and the projection 730 allows the remainder of the cubic structure contained within the volume of the server body to prevent twisting and pivoting of the entire cubic structure.

Such a retractable input/output port component 410 allows for maximizing faceplate space while keeping all features in their native forms. Such a retractable input/output port component designates certain ports as temporary use. Such a retractable input/output port component 410 implements a depth based scheme for hiding these ports in the normal use case. This retractable input/output port component 410 is especially applicable to cloud servers where cold aisle configurations are desired and as such the faceplate space often accommodates not only disks but also I/O slots. Such a retractable input/output port component 410 may be used in any server device or information handling system which has temporary use ports that may be hidden when the system is operating in its typical operating mode of operation. Such a retractable input/output port component 410 improves availability of features and airflow in server devices where faceplate space is limited.

In certain embodiments, the retractable I/O port component 410 is positioned close to one of the mounting portions 530 of the information handling system. It will be appreciated that the retractable I/O port component 410 may be positioned close to either the right side of the server faceplate or the left side of the server faceplate.

Figure 8A:
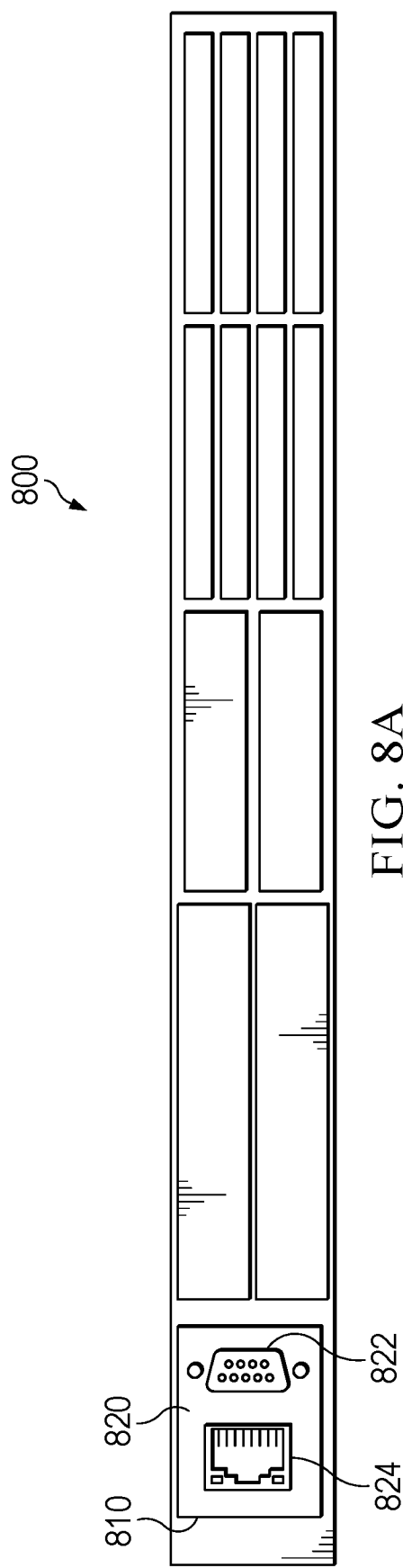
FIGS. 8A, 8B and 8C, generally referred to as FIG. 8, show a front view and top views of an example, information handling system.
Figure 8B:
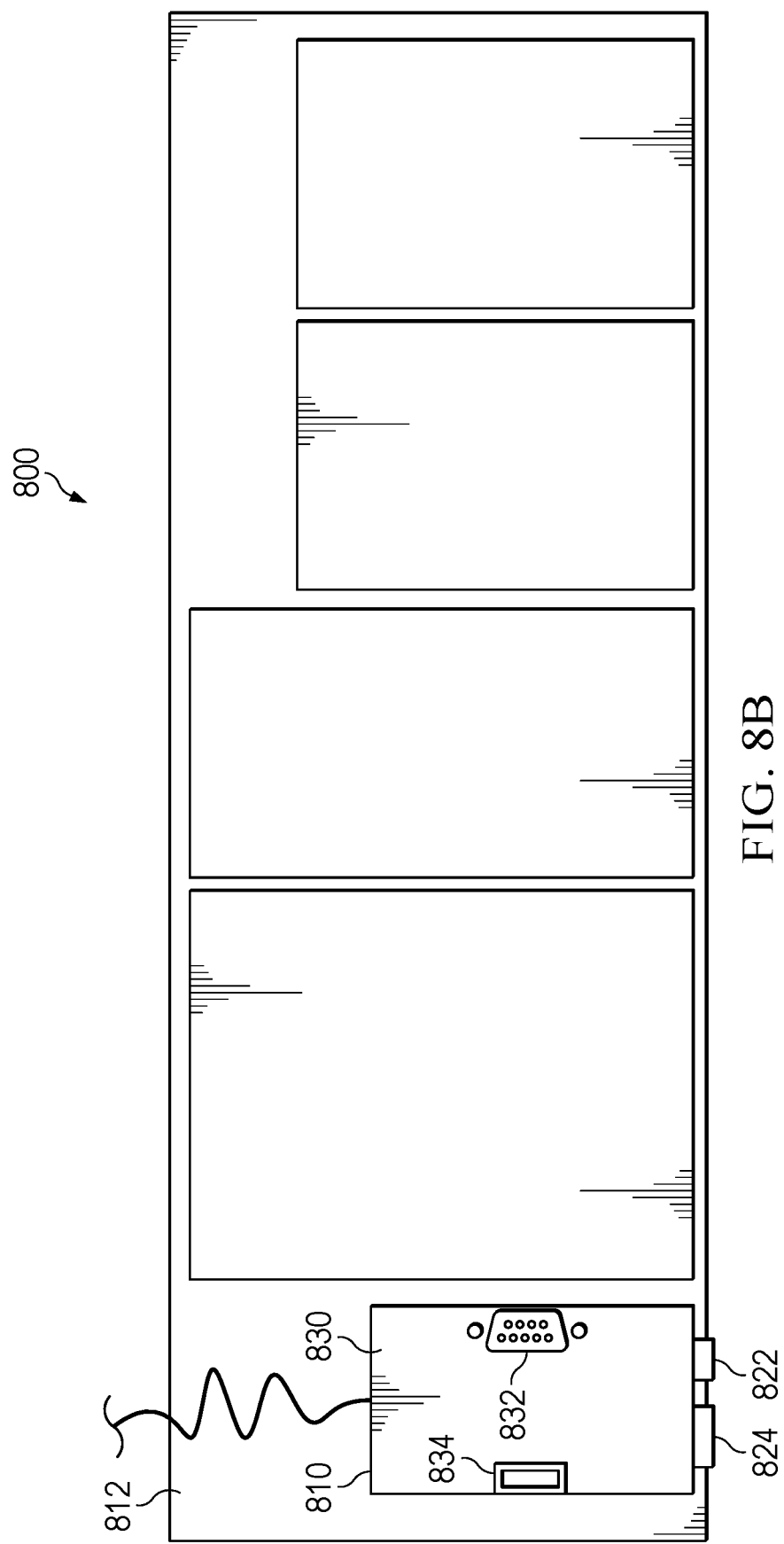
Figure 8C:
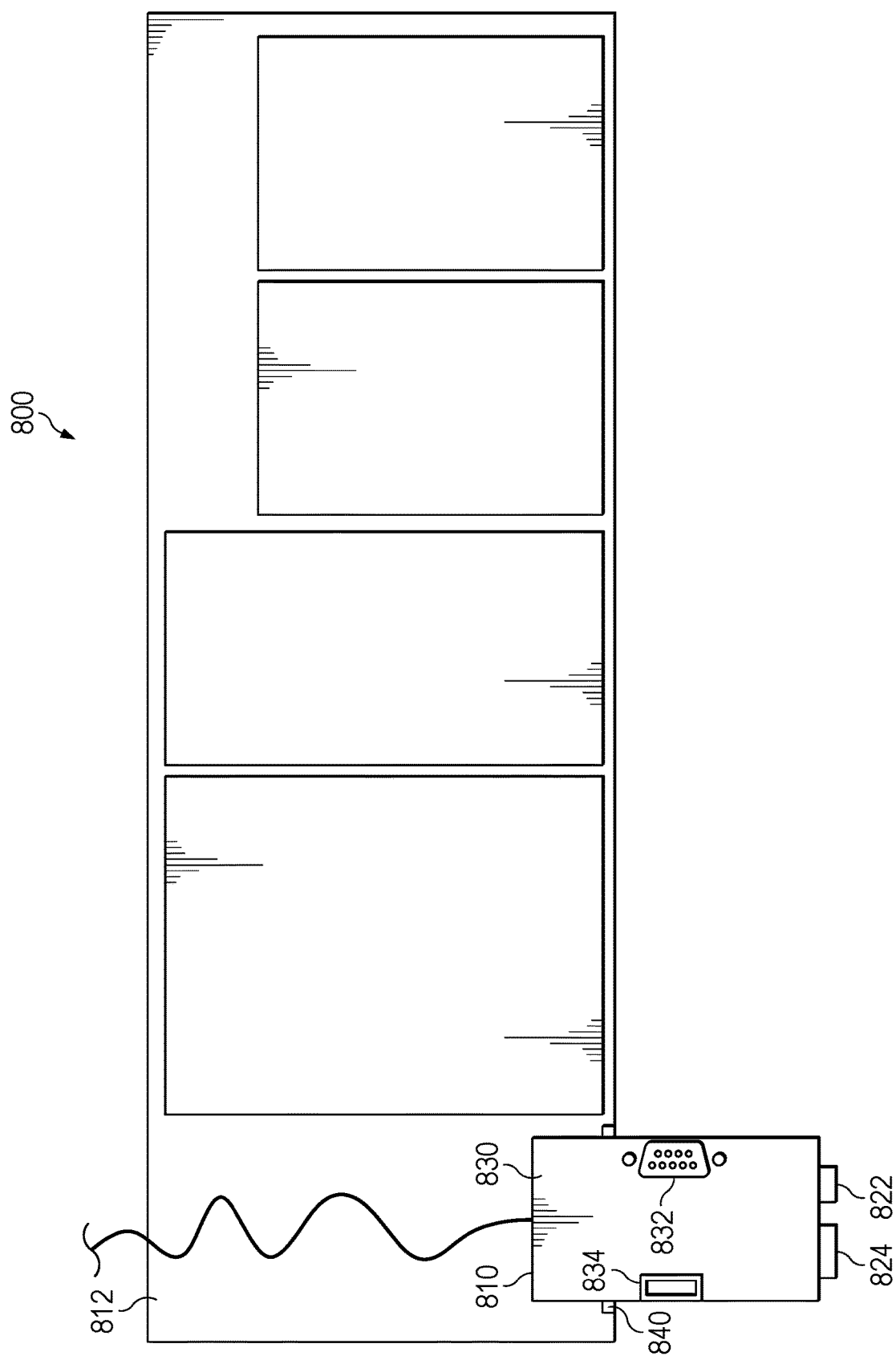

FIGS. 8A, 8B and 8C, generally referred to as FIG. 8, show a front view and top views of an example, information handling system 800. In certain embodiments, the information handling system 800 includes a retractable I/O component 810. When in a retracted orientation, the retractable I/O component fits within a volume 812 of the information handling system. In certain embodiments, the features on the front facet 820 include a serial port 822 and a data port 824 (such as an RJ45 port). In certain embodiments, the features on a side facet 830 include a VGA port 832 and a USB port 834.

In certain embodiments, the retractable I/O component 810 includes one or more stops 840 to provide a limited extraction distance. In certain embodiments, the limited extraction distance allows the remainder of the retractable I/O component 810 contained within the volume 812 of the server body to prevent pivoting of the retractable I/O component 810.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A retractable input/output port component for a server type information handling system, comprising:

a housing, the housing having a front facet and a side facet, the housing being configured to be retracted into a volume of the server type information handling system, the front facet of the housing being flush with a faceplate of the server type information handling system when the housing is retracted into the volume of the server type information handling system, the front facet filling a front edge of the volume of the server type information handling system when the housing is retracted into the volume of the server type information handling system such that the front facet extends continuously with the faceplate of the server type information handling system when the housing is retracted into the volume of the server type information handling system;

an ever present feature port, the ever present feature port being mounted to the front facet of the housing; and, a temporary use feature, the temporary use feature being mounted to the side facet of the housing, the temporary use feature being accessible when the housing is in an extracted configuration.

2. The retractable input/output port component of claim 1, wherein:
the ever present feature portion comprises one or more of a serial port and a data port.

3. The retractable input/output port component of claim 1, wherein:
the temporary use feature comprises one or more of a VGA port and a USB port.

4. The retractable input/output port component of claim 1, wherein:
the housing comprises a cubic structure.

5. The retractable input/output port component of claim 1, wherein:
the side facet of the housing comprises a ridge, the ridge separating a first portion of the side facet and a second portion of the side facet.

6. The retractable input/output port component of claim 1, wherein:
the housing comprises a stop, the stop providing a limited extraction distance when the housing is in the extracted configuration.

7. A system comprising:
a processor;
a data bus coupled to the processor; and,
a retractable input/output port component, the retractable input/output port component
comprising
a housing, the housing having a front facet and a side facet, the housing being configured to be retracted into a volume of the system, the front facet of the housing being flush with a faceplate of the system when the housing is retracted into the volume of the system, the front facet filling a front edge of the volume of the server type information handling system when the housing is retracted into the volume of the server type information handling system such that the front facet extends continuously with the faceplate of the server type information handling system when the housing is retracted into the volume of the server type information handling system;

an ever present feature port, the ever present feature port being mounted to the front facet of the housing; and, a temporary use feature, the temporary use feature being mounted to the side facet of the housing, the temporary use feature being accessible when the housing is in an extracted configuration.

8. The system of claim 7, wherein:
the ever present feature portion comprises one or more of a serial port and a data port.

9. The system of claim 7, wherein:
the temporary use feature comprises one or more of a VGA port and a USB port.

10. The system of claim 7, wherein:
the housing comprises a cubic structure.

11. The system of claim 8, wherein:
the side facet of the housing comprises a ridge, the ridge separating a first portion of the side facet and a second portion of the side facet.

12. The system of claim 7, wherein:
the housing comprises a stop, the stop providing a limited extraction distance when the housing is in the extracted configuration.

* * * * *